US008086017B2

(12) United States Patent
He et al.

(10) Patent No.: US 8,086,017 B2
(45) Date of Patent: Dec. 27, 2011

(54) DETECTING IMPROVED QUALITY COUNTERFEIT MEDIA

(75) Inventors: Chao He, Dundee (GB); Gary Ross, Edinburgh (GB)

(73) Assignee: NCR Corporation, Duluth, GA (US)

( * ) Notice: Subject to any disclaimer, the term of this patent is extended or adjusted under 35 U.S.C. 154(b) by 1094 days.

(21) Appl. No.: 11/639,576

(22) Filed: Dec. 15, 2006

(65) Prior Publication Data

US 2007/0154099 A1 Jul. 5, 2007

Related U.S. Application Data

(63) Continuation-in-part of application No. 11/366,147, filed on Mar. 2, 2006, which is a continuation-in-part of application No. 11/305,537, filed on Dec. 16, 2005, now abandoned.

(51) Int. Cl.

| | |
|---|---|
| ***G06K 9/00*** | (2006.01) |
| ***G06K 9/62*** | (2006.01) |
| ***G06K 9/46*** | (2006.01) |
| ***G06K 9/66*** | (2006.01) |
| ***G06K 9/74*** | (2006.01) |

(52) U.S. Cl. ........ 382/135; 382/159; 382/209; 382/224; 382/190; 902/7; 356/71

(58) Field of Classification Search ........................ None
See application file for complete search history.

(56) References Cited

U.S. PATENT DOCUMENTS

| | | | |
|---|---|---|---|
| 5,048,095 | A | 9/1991 | Bhanu et al. |
| 5,729,623 | A | 3/1998 | Omatu et al. |
| 6,163,618 | A | 12/2000 | Mukai |
| 2003/0021459 | A1 | 1/2003 | Neri et al. |
| 2003/0128874 | A1 | 7/2003 | Fan |

(Continued)

FOREIGN PATENT DOCUMENTS

| | | | |
|---|---|---|---|
| EP | 1 484 719 | A2 | 12/2004 |

(Continued)

OTHER PUBLICATIONS

Frosini et al., "A Neural Network-Based Model for Paper Currency Recognition and Verification", IEEE Transactions on Neural Networks, 1966.

(Continued)

*Primary Examiner* — Tom Y Lu
*Assistant Examiner* — Thomas Conway
(74) *Attorney, Agent, or Firm* — Paul W. Martin

(57) ABSTRACT

A method of creating a classifier for media validation is described. Information from all of a set of training images from genuine media items is used to form a segmentation map which is then used to segment each of the training set images. Features are extracted from the segments and used to form a classifier which is preferably a one-class statistical classifier. Classifiers can be quickly and simply formed, for example when the media is a banknote for different currencies and denominations in this way and without the need for examples of counterfeit banknotes. A media validator using such a classifier is described as well as a method of validating a banknote using such a classifier. In a preferred embodiment a plurality of segmentation maps are formed, having different numbers of segments. If higher quality counterfeit media items come into the population of media items, the media validator is able to react immediately by switching to using a segmentation map having a higher number of segments without the need for re-training.

19 Claims, 10 Drawing Sheets

U.S. PATENT DOCUMENTS

| | | | |
|---|---|---|---|
| 2003/0217906 | A1 | 11/2003 | Baudat et al. |
| 2004/0183923 | A1 | 9/2004 | Dalrymple |
| 2004/0247169 | A1 | 12/2004 | Ross et al. |

FOREIGN PATENT DOCUMENTS

| | | | |
|---|---|---|---|
| EP | 1484719 | A2 * | 12/2004 |
| EP | 1 217 589 | B1 | 2/2007 |

OTHER PUBLICATIONS

Kosaka et al., "Bill Classification by Using the LVQ Method", 2001 IEEE International Conference on System, Man and Cybernetics, 2001 (Glory).

Ahmadi et al., "A Study on Evaluating and Improving the Reliability of Bank Note Neuro-Classifiers", SICE Annual Conference in Fukui, Aug. 2003 (Glory).

Ahmadi et al., "A Reliable Method for Classification of Bank Notes Using Artificial Neural Networks", Artificial Life and Robotics, 2004 (Glory).

He C et al., "Employing optimized combinations of one-class classifiers for automated currency validation", Pattern Recognition, Elsevier, Kidlington, GB, vol. 37, No. 6, Jun. 2004, pp. 1085-1096, XP004505313, ISSN: 0031-3203.

Ramos et al., "Image Colour Segmentation by Genetic Algorithms", CVRM—Centro de Geosistemas, Instituto Superior Technico, Av. Rovisco Pais, Lisboa, Portugal (vitorino.ramos,muge@alfa.ist.utl.pt), 2000.

* cited by examiner

DETECTING IMPROVED QUALITY COUNTERFEIT MEDIA

CROSS REFERENCE TO RELATED APPLICATIONS

This application is a continuation-in-part application of U.S. patent application Ser. No. 11/366,147, filed on Mar. 2, 2006, which is a continuation-in-part application of U.S. patent application Ser. No. 11/305,537, filed on Dec. 16, 2005 now abandoned. Application Ser. No. 11/366,147, filed on Mar. 2, 2006 and application Ser. No. 11/305,537, filed on Dec. 16, 2005 are hereby incorporated by reference.

TECHNICAL FIELD

The present description relates to a method and apparatus for media validation. It is particularly related to, but in no way limited to, such methods and apparatus which are able to react to improved quality counterfeit media such as passports, checks, banknotes, bonds, share certificates or other such media.

BACKGROUND

There is a growing need for automatic verification and validation of banknotes of different currencies and denominations in a simple, reliable, and cost effective manner. This is required, for example, in self-service apparatus which receives banknotes, such as self-service kiosks, ticket vending machines, automated teller machines arranged to take deposits, self-service currency exchange machines and the like. Automatic verification of other types of valuable media such as passports, checks and the like is also required.

Previously, manual methods of media validation have involved image examination, transmission effects such as watermarks and thread registration marks, feel and even smell of banknotes, passports, checks and the like. Other known methods have relied on semi-overt features requiring semi-manual interrogation. For example, using magnetic means, ultraviolet sensors, fluorescence, infrared detectors, capacitance, metal strips, image patterns and similar. However, by their very nature these methods are manual or semi-manual and are not suitable for many applications where manual intervention is unavailable for long periods of time. For example, in self-service apparatus.

There are significant problems to be overcome in order to create an automatic media validator. For example, many different types of currency exist with different security features and even substrate types. Within those different denominations also exist commonly with different levels of security features. There is therefore a need to provide a generic method of easily and simply performing currency validation for those different currencies and denominations.

Put simply, the task of a currency validator is to determine whether a given banknote is genuine or counterfeit. Previous automatic validation methods typically require a relatively large number of examples of counterfeit banknotes to be known in order to train the classifier. In addition, those previous classifiers are trained to detect known counterfeits only. This is problematic because often little or no information is available about possible counterfeits. For example, this is particularly problematic for newly introduced denominations or newly introduced currency.

In an earlier paper entitled, "Employing optimized combinations of one-class classifiers for automated currency validation", published in Pattern Recognition 37, (2004) pages 1085-1096, by Chao He, Mark Girolami and Gary Ross (two of whom are inventors of the present application) an automated currency validation method is described (Patent No. EP1484719, US2004247169). This involves segmenting an image of a whole banknote into regions using a grid structure. Individual "one-class" classifiers are built for each region and a small subset of the region specific classifiers are combined to provide an overall decision. (The term, "one-class" is explained in more detail below.) The segmentation and combination of region specific classifiers to achieve good performance is achieved by employing a genetic algorithm. This method requires a small number of counterfeit samples at the genetic algorithm stage and as such is not suitable when counterfeit data is unavailable.

There is also a need to perform automatic currency validation in a computationally inexpensive manner which can be performed in real time.

Another problem relates to situations in which automatic currency validation systems are in place and are relatively successfully operating in a given environment. For example, that environment comprises a population of genuine and counterfeit banknotes with a given quality range and distribution. If sudden changes to that environment occur it is typically difficult for such automated currency validation systems to adapt. For example, suppose the new higher quality counterfeit banknotes suddenly begin to enter the banknote population. Police intelligence, manual validation and other information sources might indicate the presence of the higher quality counterfeit banknotes. In this situation, if a bank or other provider finds counterfeit notes are being accepted at automated currency validation machines, a commercial decision is typically made to stop using those machines. However, this is costly because manual validation needs to be made instead and customers are inconvenienced. Significant time and cost also needs to be invested to upgrade the automated currency validation systems to cope with the higher quality counterfeit banknotes.

Many of the issues mentioned above also apply to validation of other types of valuable media such as passports, checks and the like

SUMMARY

A method of creating a classifier for media validation is described. Information from all of a set of training images from genuine media items only is used to form a segmentation map which is then used to segment each of the training set images. Features are extracted from the segments and used to form a classifier which is preferably a one-class statistical classifier. Classifiers can be quickly and simply formed for different currencies and denominations in this way and without the need for examples of counterfeit media items. A media validator using such a classifier is described as well as a method of validating a media item using such a classifier. In a preferred embodiment a plurality of segmentation maps are formed, having different numbers of segments. If higher quality counterfeit media items come into the population of media items, the media validator is able to automatically switch to using a segmentation map having a higher number of segments without the need for re-training.

The method may be performed by software in machine readable form on a storage medium. The method steps may be carried out in any suitable order and/or in parallel as is apparent to the skilled person in the art.

This acknowledges that software can be a valuable, separately tradable commodity. It is intended to encompass software, which runs on or controls "dumb" or standard hardware, to carry out the desired functions, (and therefore the software essentially defines the functions of the media validator, and can therefore be termed a media validator, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved. Although the present examples are described and illustrated herein as being implemented in a banknote validation system, the system described is provided as an example and not a limitation. As those skilled in the art will appreciate, the present examples are suitable for application in a variety of different types of media validation systems, including, but not limited to, passport validation systems, check validation systems, bond validation systems and share certificate validation systems.

The term "one class classifier" is used to refer to a classifier that is formed or built using information about examples only from a single class but which is used to allocate newly presented examples either to that single class or not. This differs from a conventional binary classifier which is created using information about examples from two classes and which is used to allocate new examples to one or other of those two classes. A one-class classifier can be thought of as defining a boundary around a known class such that examples falling out with that boundary are deemed not to belong to the known class.

Figure 1:
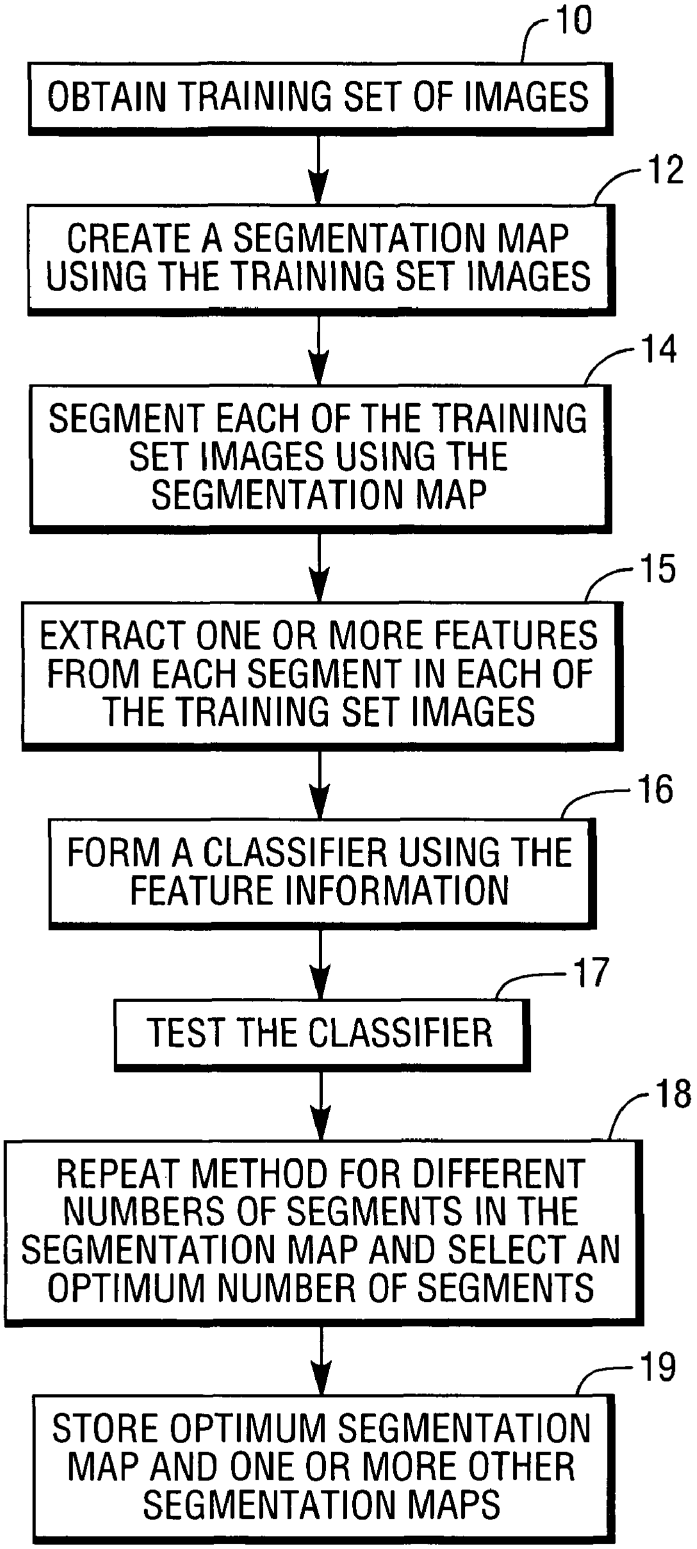
FIG. 1 is a flow diagram of a method of creating a classifier for banknote validation.

FIG. 1 is a high level flow diagram of a method of creating a classifier for banknote validation.

First we obtain a training set of images of genuine banknotes (see box 10 of FIG. 1). These are images of the same type taken of banknotes of the same currency and denomination. The type of image relates to how the images are obtained, and this may be in any manner known in the art. For example, reflection images, transmission images, images on any of a red, blue or green channel, thermal images, infrared images, ultraviolet images, x-ray images or other image types. The images in the training set are in registration and are the same size. Pre-processing can be carried out to align the images and scale them to size if necessary, as known in the art.

Figure 6:
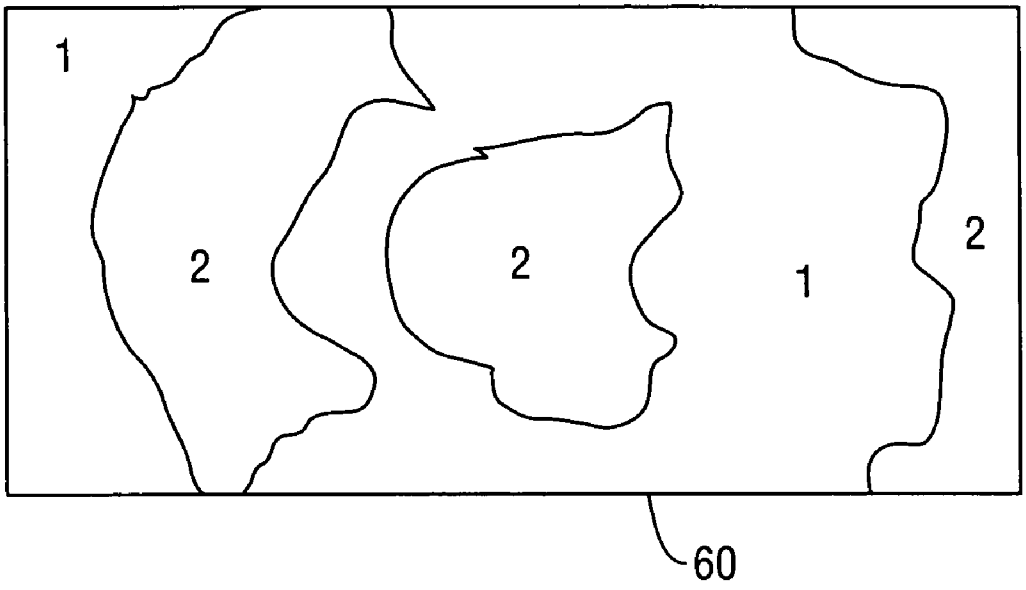
FIG. 6 is a schematic diagram of a segmentation map for two segments.

We next create a segmentation map using information from the training set images (see box 12 of FIG. 1). The segmentation map comprises information about how to divide an image into a plurality of segments. The segments may be non-continuous, that is, a given segment can comprise more than one patch in different regions of the image. The segmentation map is formed in any suitable manner and examples of some methods are given in detail below. For example, the segments are formed based on a distribution of the amplitudes of each pixel and the relationship to the amplitudes of the other pixels that make up the image across a plurality of images using in a training set of images. Preferably, but not essentially, the segmentation map also comprises a specified number of segments to be used. For example, FIG. 6 is a schematic representation of a segmentation map 60 having two segments labeled 1 and 2 in the Figure. The segmentation map corresponds to the surface area of a banknote with segment 1 comprising those regions marked 1 and segment 2 comprising those regions marked 2. A one segment map would comprise a representation of the whole surface area of a banknote. The maximum number of segments, in the case that segments are based on pixel information, would be the total number of pixels in an image of a banknote.

Using the segmentation map we segment each of the images in the training set (see box 14 of FIG. 1). We then extract one or more features from each segment in each of the training set images (see box 15 of FIG. 1). By the term "feature" we mean any statistic or other characteristic of a segment. For example, the mean pixel intensity, median pixel intensity, mode of the pixel intensities, texture, histogram, Fourier transform descriptors, wavelet transform descriptors and/or any other statistics in a segment.

A classifier is then formed using the feature information (see box 16 of FIG. 1). Any suitable type of classifier can be used as known in the art. In a particularly preferred embodiment of the invention the classifier is a one-class classifier and no information about counterfeit banknotes is needed. However, it is also possible to use a binary classifier or other type of classifier of any suitable type as known in the art.

The method in FIG. 1 enables a classifier for validation of banknotes of a particular currency and denomination to be formed simply, quickly and effectively. To create classifiers for other currencies or denominations the method is repeated with appropriate training set images.

Using segmentation maps of different numbers of segmentations yields different results. In addition, as the number of segments increases, the processing required per banknote increases. In a preferred embodiment we therefore carry out trials during training and testing (if information about counterfeit notes is available) in order to select an optimum number of segments for the segmentation map.

This is indicated in FIG. 1. The classifier is tested (see box 17) to assess its performance in terms of false accept and/or false reject rates. A false accept rate is an indication of how often a classifier indicates a counterfeit banknote as being genuine. A false reject rate is an indication of how often a classifier indicates a genuine banknote as being counterfeit. This testing involves the use of known counterfeits or "dummy" counterfeits created for testing purposes.

The method of FIG. 1 is then repeated for different numbers of segments in the segmentation map (see box 18) and an optimum number of segments selected. For example, this is done by forming a graph similar to that of FIGS. 7 and 8. If there are no available counterfeits for testing, the number of segments may be set to a number which works well for most of currencies. Our experimental results show that currencies with good security design only require from 2 to 5 segments to achieve good false accept and false reject performance; whilst currencies with poor security design may require around 15 segments.

The optimum segmentation map and one or more other alternative segmentation maps are then stored (see box 19 of FIG. 1). For each of these segmentation maps an associated set of classification parameters may be calculated and stored.

Figure 7:
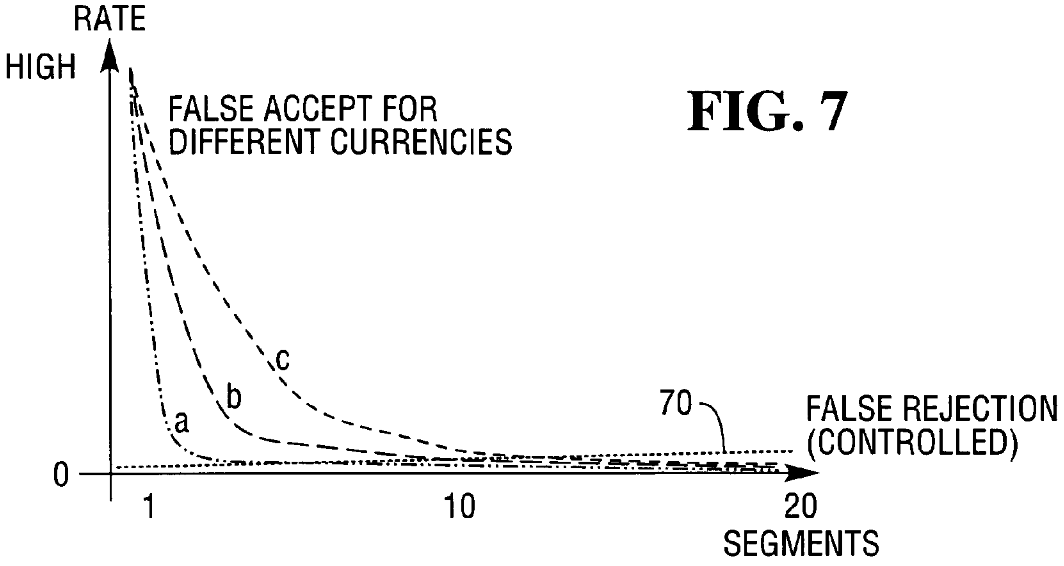
FIG. 7 is a graph of false accept/false reject rate against number of segments in a segmentation map for three different currencies.
Figure 8:
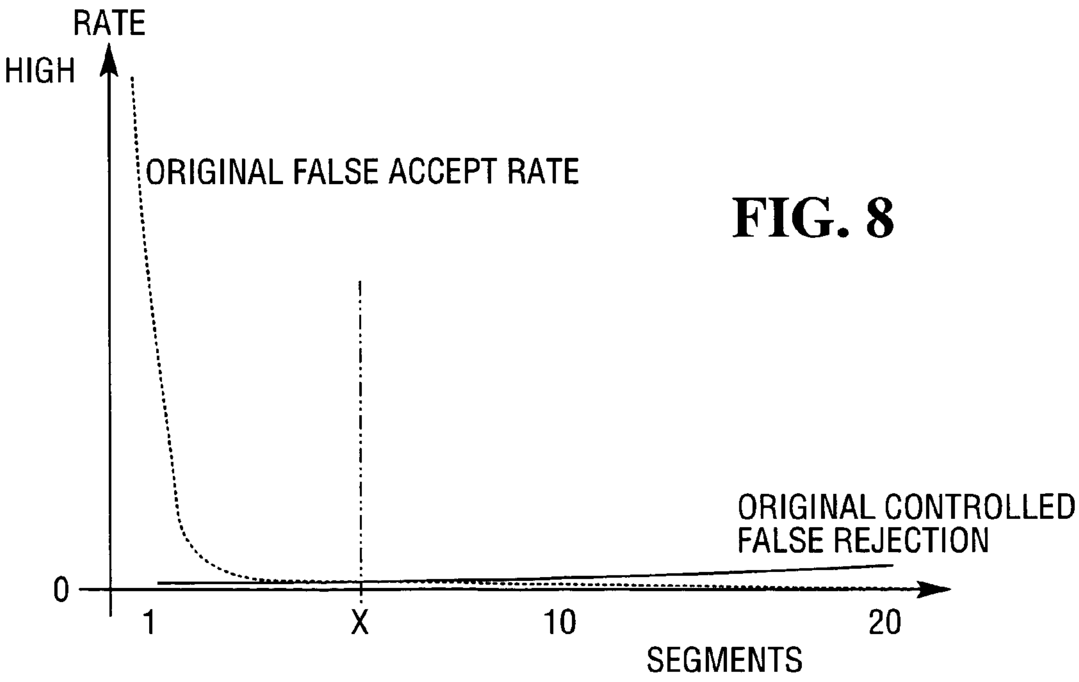
FIG. 8 is a graph similar to that of FIG. 7 indicating selection of a number of segments.

FIG. 7 is a graph of false accept rate/false reject rate against number of segments in the segmentation map for three currencies and using a banknote validation method as described herein. The false accept rates for the three currencies are indicated by the curves a, b, c. The false reject rates are similar for each currency and are indicated by the line 70.

It can be seen that, as the number of segments in the segmentation map increases, the chances of falsely accepting a counterfeit are reduced. However, there is a smaller increase in the risk of rejecting a genuine note.

In a preferred embodiment we select the fewest number of segments such that the false accept rate is almost zero. For example, FIG. 8, which is similar to FIG. 7, shows a number of segments X selected using this criterion.

Figure 9:
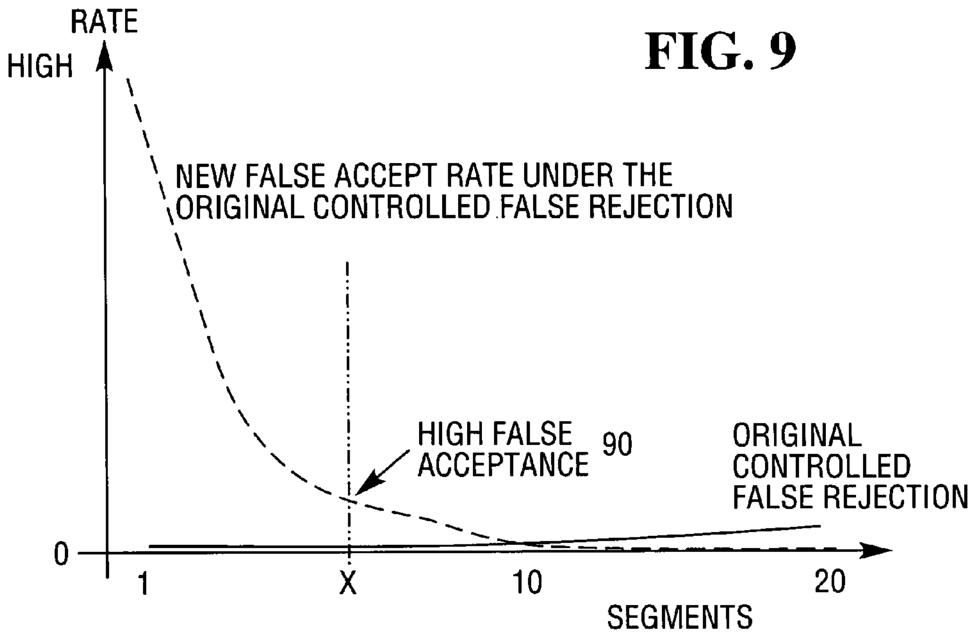
FIG. 9 is a graph for the situation of FIG. 8 where improved quality counterfeit banknotes enter the population.
Figure 10:
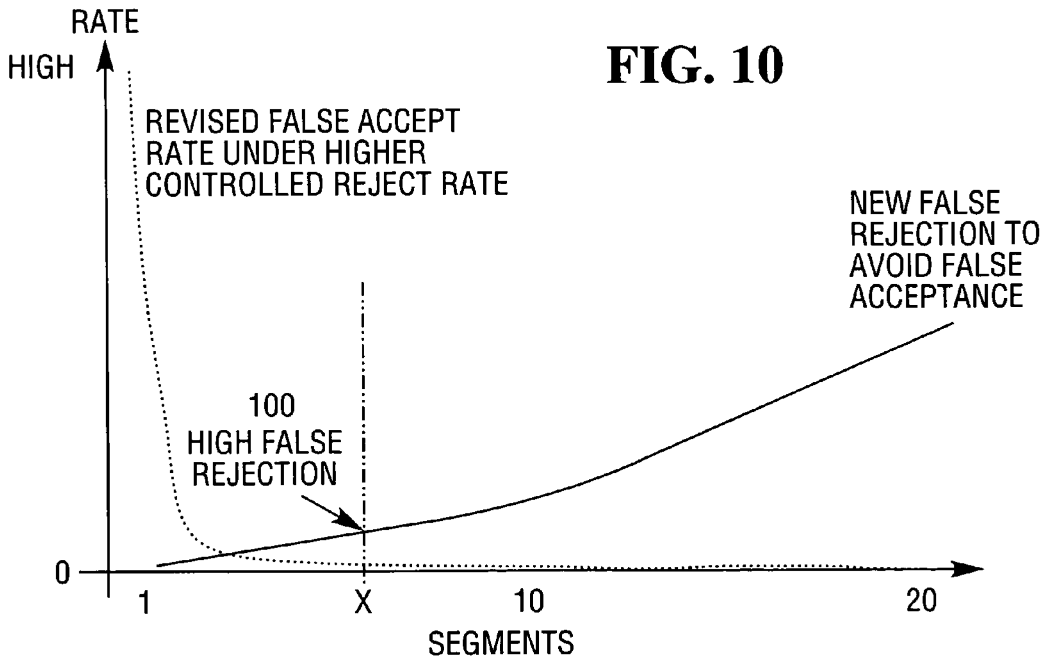
FIG. 10 is a graph for the situation of FIG. 8 showing an inflated false reject rate.

However, there may be a point during the life of the currency, where the quality of counterfeit banknotes increases. For example, the currency may become the target of a more organized counterfeit ring. Also, more advanced reprographic technology or techniques may become available. In this situation, counterfeit banknotes may be accepted as genuine by the automated system. This leads to an increase in the false accept rate as indicated in FIG. 9 at 90. If the automated currency validation system has only the segmentation map using a low number, X of segments (see FIG. 9 and 10) then all that can be done is to push the false reject rate very high (see 100 of FIG. 10). This would mean that the counterfeit notes would not be accepted but at the expense of rejecting a large proportion of genuine banknotes (100% in extreme cases, i.e. temporarily switch off the support for this currency/denomination, and this is not unusual in current practice). To address this problem without the need for switching off the service or retraining the classifier, we simply replace the original segmentation map with one predefined alternative segmentation map which has a higher number of segments. A first set of classification parameters associated with the original segmentation map may be replaced by another set of classification parameters associated with the pre-defined alternative segmentation map.

Figure 11:
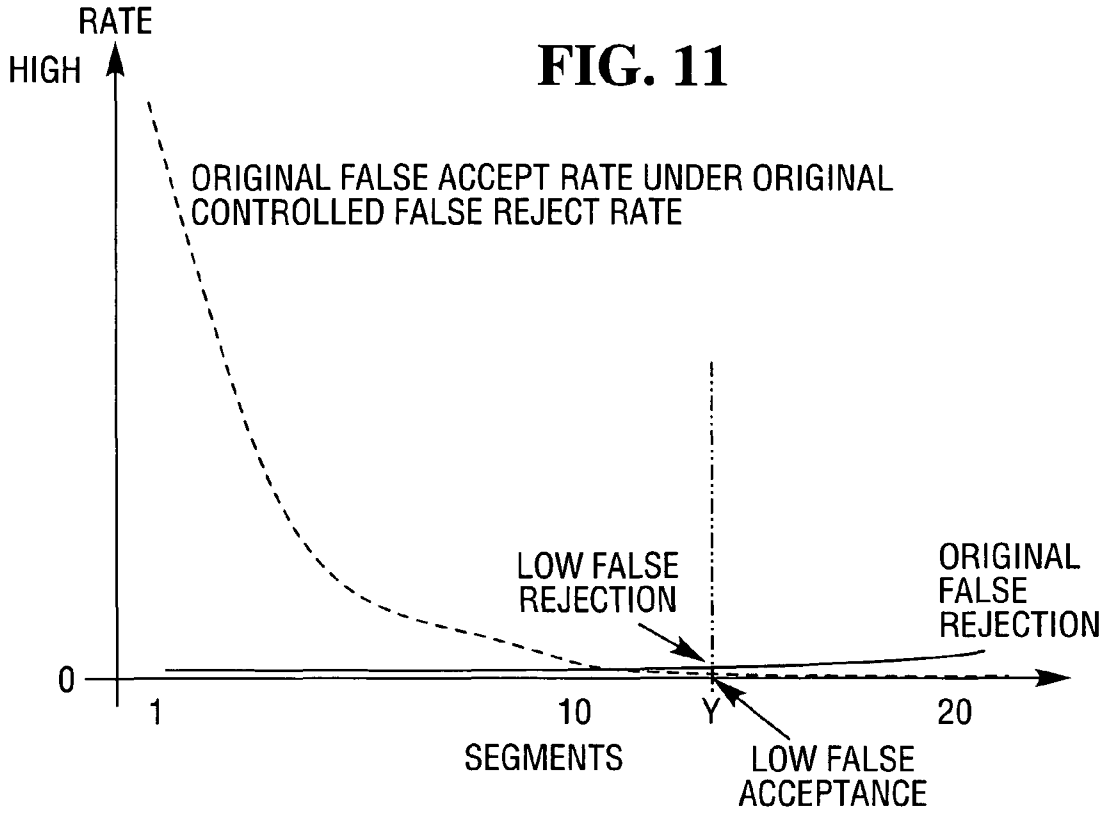
FIG. 11 is a graph for the situation of FIG. 9 but using a segmentation map with a higher number of segments.

This is illustrated in FIG. 11. The number of segments in the segmentation map is now Y which is larger than X. It can be seen that the false reject rate at Y is kept low as is the false accept rate.

By replacing the set of classification parameters in this way, retraining is not necessary. Thus a system for automatic currency validation can be quickly and simply adjusted to respond to introduction of higher quality counterfeit banknotes. This is described in more detail later in this document with reference to FIG. 5.

More detail about examples of segmentation techniques is now given.

Previously in EP1484719 and US2004247169, (as mentioned in the background section) we used a segmentation technique that involved using a grid structure over the image plane and a genetic algorithm method to form the segmentation map. This necessitated using information about counterfeit notes, and incurring computational costs when performing genetic algorithm search.

The present invention uses a different method of forming the segmentation map which removes the need for using a genetic algorithm or equivalent method to search for a good segmentation map within a large number of possible segmentation maps. This reduces computational cost and improves performance. In addition the need for information about counterfeit banknotes is removed.

We believe that generally it is difficult in the counterfeiting process to provide a uniform quality of imitation across the whole note and therefore certain regions of a note are more difficult than others to be copied successfully. We therefore recognized that rather than using a rigidly uniform grid segmentation we could improve banknote validation by using a more sophisticated segmentation. Empirical testing that we carried out indicated that this is indeed the case. Segmentation based on morphological characteristics such as pattern, color and texture led to a better performance in detecting counterfeits. However, traditional image segmentation methods, such as using edge detectors, when applied to each image in the training set were difficult to use. This is because varying results are obtained for each training set member and it is difficult to align corresponding features in different training set images. In order to avoid this problem of aligning segments we used, in one preferred embodiment, a so called "spatio-temporal image decomposition".

Details about the method of forming the segmentation map are now given. At a high level this method can be thought of as specifying how to divide the image plane into a plurality of segments, each comprising a plurality of specified pixels. The segments can be non-continuous as mentioned above. In the present invention, this specification is made on the basis of information from all images in the training set. In contrast, segmentation using a rigid grid structure does not require information from images in the training set.

For example, each segmentation map comprises information about relationships of corresponding image elements between all images in the training set.

Consider the images in the training set as being stacked and in registration with one another in the same orientation. Taking a given pixel in the note image plane this pixel is thought of as having a "pixel intensity profile" comprising information about the pixel intensity at that particular pixel position in each of the training set images. Using any suitable clustering algorithm, pixel positions in the image plane are clustered into segments, where pixel positions in those segments have similar or correlated pixel intensity profiles.

In a preferred example we use these pixel intensity profiles. However, it is not essential to use pixel intensity profiles. It is also possible to use other information from all images in the training set. For example, intensity profiles for blocks of 4 neighboring pixels or mean values of pixel intensities for pixels at the same location in each of the training set images.

A particularly preferred embodiment of our method of forming the segmentation map is now described in detail.

This is based on the method taught in the following publication "EigenSegments: A spatio-temporal decomposition of an ensemble of images" by Avidan, S. Lecture Notes in Computer Science, 2352: 747-758, 2002.

Given an ensemble of images $\{I_i\}$i=1, 2, . . . , N which have been registered and scaled to the same size r×c, each image $I_i$ can be represented by its pixels as $[a_{1i}, a_{2i}, \ldots, a_{Mi}]^T$ in vector form, where $a_{ji}$(j=1, 2, . . . , M) is the intensity of the jth pixel in the ith image and M=r·c is the total number of pixels in the image. A design matrix $A \in \mathfrak{R}^{M \times N}$ can then be generated by stacking vectors $I_i$ (zeroed using the mean value) of all images in the ensemble, thus $A=\lfloor I_1, I_2, \ldots, I_N \rfloor$. A row vector $\lfloor a_{ji}, a_{j2}, \ldots, a_{jN} \rfloor$ in A can be seen as an intensity profile for a particular pixel (jth) across N images. If two pixels come from the same pattern region of the image they are likely to have the similar intensity values and hence have a strong temporal correlation. Note the term "temporal" here need not exactly correspond to the time axis but is borrowed to indicate the axis across different images in the ensemble. Our algorithm tries to find these correlations and segments the image plane spatially into regions of pixels that have similar temporal behavior. We measure this correlation by defining a metric between intensity profiles. A simple way is to use the Euclidean distance, i.e. the temporal correlation between two pixels j and k can be denoted as $$d(j, k) = \sqrt{\sum_{i=1}^{N} (a_{ji} - a_{ki})^2}.$$

The smaller d(j,k), the stronger the correlation between the two pixels.

In order to decompose the image plane spatially using the temporal correlations between pixels, we run a clustering algorithm on the pixel intensity profiles (the rows of the design matrix A). It will produce clusters of temporally correlated pixels. The most straightforward choice is to employ the K-means algorithm, but it could be any other clustering algorithm. As a result the image plane is segmented into several segments of temporally correlated pixels. This can then be used as a map to segment all images in the training set; and a classifier can be built on features extracted from those segments of all images in the training set.

In order to achieve the training without utilizing counterfeit notes, one-class classifier is preferable. Any suitable type of one-class classifier can be used as known in the art. For example, neural network based one-class classifiers and statistical based one-class classifiers.

Suitable statistical methods for one-class classification are in general based on maximization of the log-likelihood ratio under the null-hypothesis that the observation under consideration is drawn from the target class and these include the $D^2$ test (described in Morrison, D F: Multivariate Statistical Methods (third edition). McGraw-Hill Publishing Company, New York, 1990) which assumes a multivariate Gaussian distribution for the target class (genuine currency). In the case of an arbitrary non-Gaussian distribution the density of the target class can be estimated using for example a semi-parametric Mixture of Gaussians (described in Bishop, C M: Neural Networks for Pattern Recognition, Oxford University Press, New York, 1995) or a non-parametric Parzen window (described in Duda, R O, Hart, P E, Stork, D G: Pattern Classification (second edition), John Wiley & Sons, INC, New York, 2001) and the distribution of the log-likelihood ratio under the null-hypothesis can be obtained by sampling techniques such as the bootstrap (described in Wang, S, Woodward, W A, Gary, H L et al: A new test for outlier detetion from a multivariate mixture distribution, Journal of Computational and Graphical Statistics, 6(3): 285-299, 1997).

Other methods which can be employed for one-class classification are Support Vector Data Domain Description (SVDD) (described in Tax, DMJ, Duin, RPW: Support vector domain description, Pattern Recognition Letters, 20(11-12): 1191-1199, 1999), also known as 'support estimation' (described in Hayton, P, Schölkopf, B, Tarrassenko, L, Anuzis, P: Support Vector Novelty Detection Applied to Jet Engine Vibration Spectra, Advances in Neural Information Processing Systems, 13, eds Leen, Todd K and Dietterich, Thomas G and Tresp, Volker, MIT Press, 946-952, 2001) and Extreme Value Theory (EVT) (described in Roberts, S J: Novelty detection using extreme value statistics. IEE Proceedings on Vision, Image & Signal Processing, 146(3): 124-129, 1999). In SVDD the support of the data distribution is estimated, whilst the EVT estimates the distribution of extreme values. For this particular application, large numbers of examples of genuine notes are available, so in this case it is possible to obtain reliable estimates of the target class distribution. We therefore choose one-class classification methods that can estimate the density distribution explicitly in a preferred embodiment, although this is not essential. In a preferred embodiment we use one-class classification methods based on the parametric $D^2$ test).

For example, the statistical hypothesis tests used for our one-class classifier are detailed as follows:

Consider N independent and identically distributed p-dimensional vector samples (the feature set for each banknote) $x_1, \ldots, x_N \in C$ with an underlying density function with parameters θ given as p(x|θ). The following hypothesis test is given for a new point $x_{N+1}$ such that $H_0: x_{N+1} \in C$ vs. $H_1: x_{N+1} \notin C$, where C denotes the region where the null hypothesis is true and is defined by p(x|θ). Assuming that the distribution under the alternate hypothesis is uniform then the standard log-likelihood ratio for the null and alternate hypothesis $$\lambda = \frac{\sup_{\theta \in \Theta} L_0(\theta)}{\sup_{\theta \in \Theta} L_1(\theta)} = \frac{\sup_{\theta} \prod_{n=1}^{N+1} p(x_n \mid \theta)}{\sup_{\theta} \prod_{n=1}^{N} (x_n \mid \theta)} \quad (1)$$

can be employed as a test statistic for the null-hypothesis. In this preferred embodiment we can use the log-likelihood ratio as test statistic for the validation of a newly presented note.

Feature vectors with multivariate Gaussian density: Under the assumption that the feature vectors describing individual points in a sample are multivariate Gaussian, a test that emerges from the above likelihood ratio (1), to assess whether each point in a sample shares a common mean is described in (Morrison, D F: Multivariate Statistical Methods.(third edition). McGraw-Hill Publishing Company, New York, 1990). Consider N independent and identically distributed p-dimensional vector samples $x_1, \ldots, x_N$ from a multivariate normal distribution with mean μ, and covariance C, whose sample estimates are $\hat{\mu}_N$ and $\hat{C}_N$. From the sample consider a random selection denoted as $x_0$, the associated squared Mahalanobis distance $$D^2 = (x_0 - \hat{\mu}_N)^T \hat{C}_N^{-1} (x_0 - \hat{\mu}_N) \quad (2)$$

can be shown to be distributed as a central F-distribution with p and N−p−1 degrees of freedom by $$F = \frac{(N-p-1)ND^2}{p(N-1)^2 - NpD^2}. \tag{3}$$

Then, the null hypothesis of a common population mean vector $x_0$ and the remaining $x_i$ will be rejected if $$F > F_{\alpha;p,N-p-1}, \tag{4}$$

where $F_{\alpha;p,N-p-1}$ is the upper $\alpha \cdot 100\%$ point of the F-distribution with (p,N−p−1) degrees of freedom.

Now suppose that $x_0$ was chosen as the observation vector with the maximum $D^2$ statistic. The distribution of the maximum $D^2$ from a random sample of size N is complicated. However a conservative approximation to the 100α percent upper critical value can be obtained by the Bonferroni inequality. Therefore we might conclude that $x_0$ is an outlier if $$F > F_{\frac{\alpha}{N};p,N-p-1}. \tag{5}$$

In practice, both equations (4) and (5) can be used for outlier detection.

We can make use of the following incremental estimates of the mean and covariance in devising a test for new examples which do not form part of the original sample when an additional datum $x_{N+1}$ is made available, i.e. the mean $$\hat{\mu}_{N+1} = \frac{1}{N+1}\{N\hat{\mu}_N + x_{N+1}\} \tag{6}$$

and the covariance $$\hat{C}_{N+1} = \frac{N}{N+1}\hat{C}_N + \frac{N}{(N+1)^2}(x_{N+1} - \hat{\mu}_N)(x_{N+1} - \hat{\mu}_N)^T. \tag{7}$$

By using the expression of (6), (7) and the matrix inversion lemma, Equation (2) for an N-sample reference set and an N+1'th test point becomes $$D^2 = \sigma_{N+1}^T \hat{C}_{N+1}^{-1} \sigma_{N+1}, \tag{8}$$

where $$\sigma_{N+1} = (x_{N+1} - \hat{\mu}_{N+1}) = \frac{N}{N+1}(x_{N+1} - \hat{\mu}_N), \tag{9}$$

and $$\hat{C}_{N+1}^{-1} = \frac{N+1}{N}\left(\hat{C}_N^{-1} - \frac{\hat{C}_N^{-1}(x_{N+1} - \hat{\mu}_N)(x_{N+1} - \hat{\mu}_N)^T \hat{C}_N^{-1}}{N+1+(x_{N+1} - \hat{\mu}_N)^T \hat{C}_N^{-1}(x_{N+1} - \hat{\mu}_N)}\right). \tag{10}$$

Denoting $(x_{N+1} - \hat{\mu}_N)^T \hat{C}_N^{-1}(x_{N+1} - \hat{\mu}_N)$ by $D_{N+1,N}^2$, then $$D^2 = \frac{ND_{N+1,N}^2}{N+1+D_{N+1,N}^2}. \tag{11}$$

So a new point $x_{N+1}$ can be tested against an estimated and assumed normal distribution for a common estimated mean $\hat{\mu}_N$ and covariance $\hat{C}_N$. Though the assumption of multivariate Gaussian feature vectors often does not hold in practice, it has been found an appropriate pragmatic choice for many applications. We relax this assumption and consider arbitrary densities in the following section.

Feature Vectors with arbitrary Density: A probability density estimate $\hat{p}(x;\theta)$ can be obtained from the finite data sample $S=\{x_1, \ldots, x_N\} \in \mathfrak{R}^d$ drawn from an arbitrary density p(x), by using any suitable semi-parametric (e.g. Gaussian Mixture Model) or non-parametric (e.g. Parzen window method) density estimation methods as known in the art. This density can then be employed in computing the log-likelihood ratio (1). Unlike the case of the multivariate Gaussian distribution there is no analytic distribution for the test statistic (λ) under the null hypothesis. So to obtain this distribution, numerical bootstrap methods can be employed to obtain the otherwise non-analytic null distribution under the estimated density and so the various critical values of $\lambda_{crit}$ can be established from the empirical distribution obtained. It can be shown that in the limit as $N \to \infty$, the likelihood ratio can be estimated by the following $$\lambda = \frac{\sup_{\theta \in \Theta} L_0(\theta)}{\sup_{\theta \in \Theta} L_1(\theta)} \to \hat{p}(x_{N+1};\hat{\theta}_N) \tag{12}$$

where $\hat{p}(x_{N+1};\hat{\theta}_N)$ denotes the probability density of $x_{N+1}$ under the model estimated by the original N samples.

After generating B sets bootstrap of N samples from the reference data set and using each of these to estimate the parameters of the density distribution $\hat{\theta}_N^i$, B bootstrap replicates of the test statistic $\lambda_{crit}^i$, i=1, . . . , B can be obtained by randomly selecting an N+1'th sample and computing $\hat{P}(x_{N+1};\hat{\theta}_N^i) \approx \lambda_{crit}^i$. By ordering $\lambda_{crit}^i$ in ascending order, the critical value α can be defined to reject the null-hypothesis at the desired significance level if $\lambda \leqq \lambda_\alpha$, where $\lambda_\alpha$ is the jth smallest value of $\lambda_{crit}^i$, and $\alpha = j/(B+1)$.

Preferably the method of forming the classifier is repeated for different numbers of segments and tested using images of banknotes known to be either counterfeit or not. The number of segments giving the best performance and its corresponding set of classification parameters are selected. We found the best number of segments to be from about 2 to 15 for most of currencies although any suitable number of segments can be used.

Figure 2:
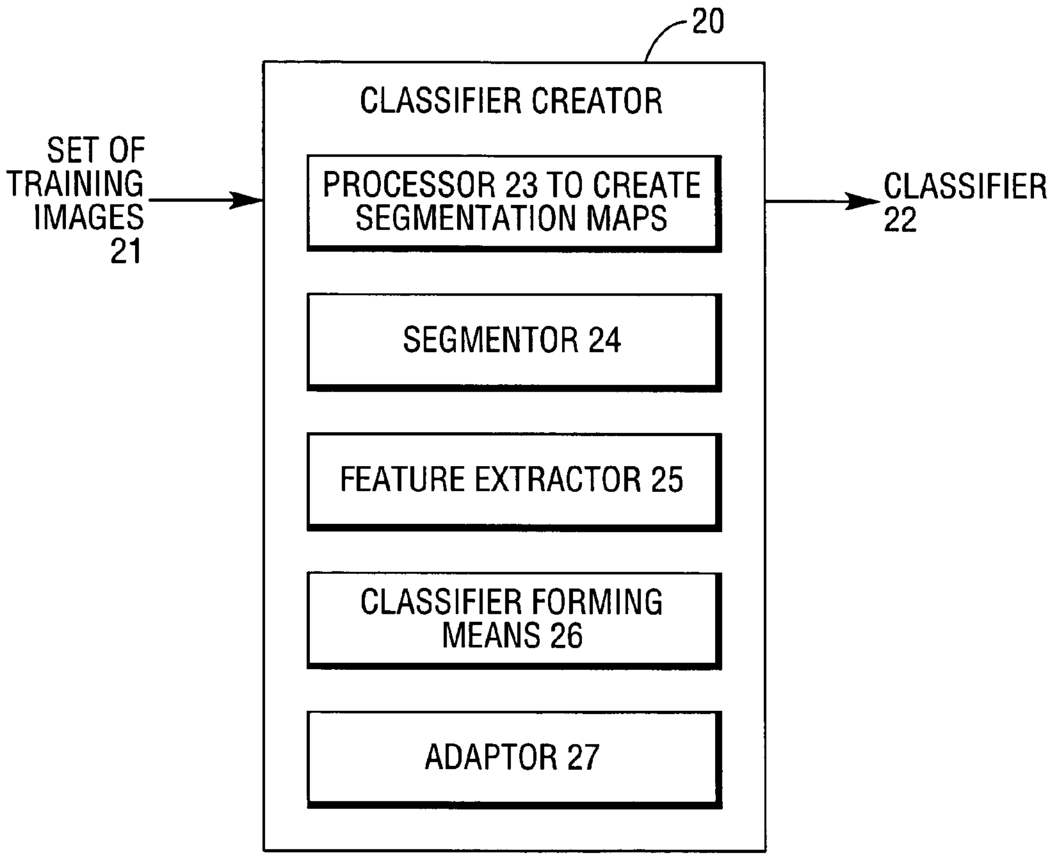
FIG. 2 is a schematic diagram of an apparatus for creating a classifier for banknote validation.

FIG. 2 is a schematic diagram of an apparatus 20 for creating a classifier 22 for banknote validation. It comprises:

- an input 21 arranged to access a training set of banknote images;
- a processor 23 arranged to create a plurality of segmentation maps using the training set images, each segmentation map having a different number of segments;
- a segmentor 24 arranged to segmenting each of the training set images using a selected one of the segmentation maps;
- a feature extractor 25 arranged to extract one or more features from each segment in each of the training set images;
- the processor 23 may also be arranged to calculate for each segmentation map, a set of classification parameters, using the results of the segmentor 24 and feature extractor 25 classification forming means 26 arranged to use a first selected one of the sets of classification parameters; and an adaptor 27, arranged to replace the first selected set of classification parameters by one of the other sets of classification parameters, wherein the processor is arranged to create the segmentation maps on the basis of information from all images in the training set. For example, by using spatio-temporal image decomposition described above.

Optionally the apparatus for creating the classifier also comprises a selector which selects an optimum segmentation map and/or associated set of classification parameters as well as one or more alternative segmentation maps and/or associated sets of classification parameters by evaluating the classification performance of each.

Figure 3:
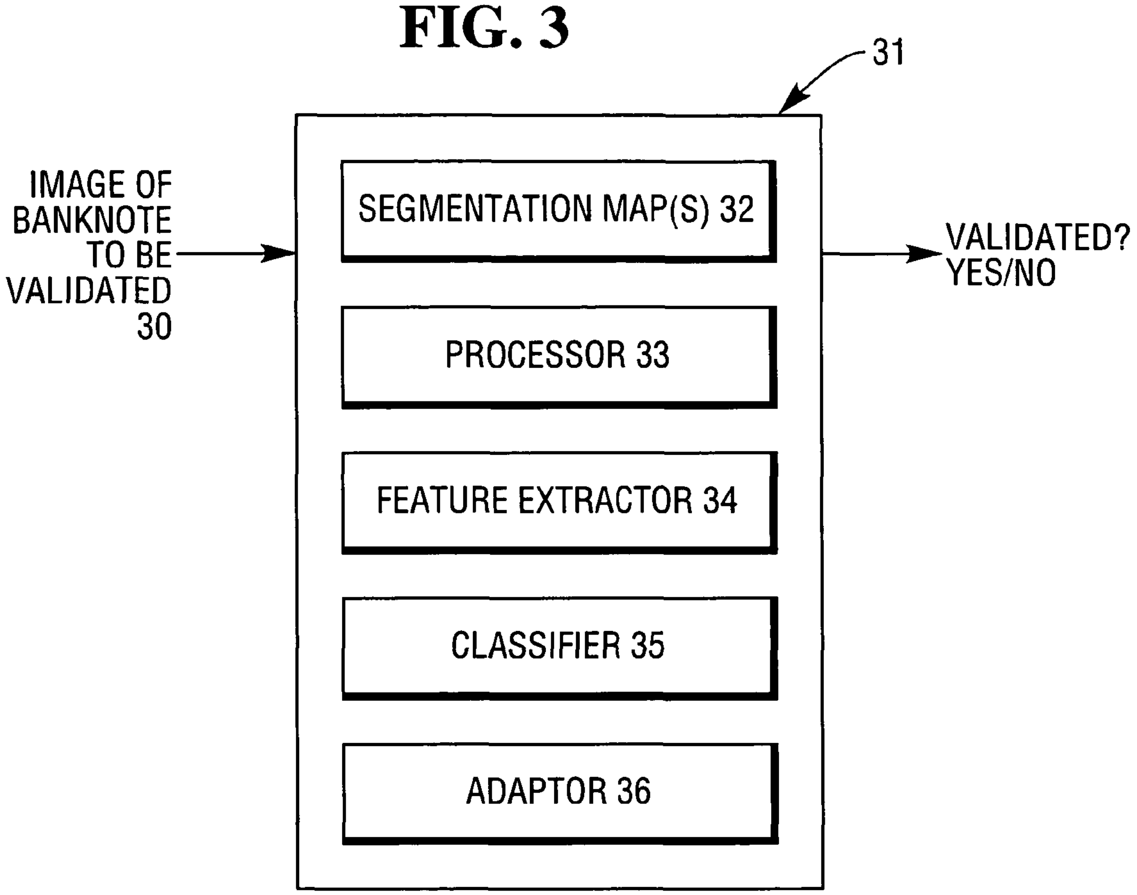
FIG. 3 is a schematic diagram of a banknote validator.

FIG. 3 is a schematic diagram of a banknote validator 31. It comprises:

an input arranged to receive at least one image 30 of a banknote to be validated;

a plurality of segmentation maps 32 each having a different number of segments, consisting of one optimum segmentation map and one or more alternative segmentation maps determined during the training stage;

a processor 33 arranged to segment the image of the banknote using a first one of the segmentation maps;

a feature extractor 34 arranged to extract one or more features from each segment of the banknote image;

a classifier 35 arranged to classify the banknote as being either valid or not on the basis of the extracted features; and an adaptor 36 arranged to replace the first segmentation map by one of the other segmentation maps and replace the classifier by a classifier associated with that other segmentation map, wherein the segmentation maps are formed on the basis of information about each of a set of training images of banknotes. It is noted that it is not essential for the components of FIG. 3 to be independent of one another, these may be integral.

Figure 4:
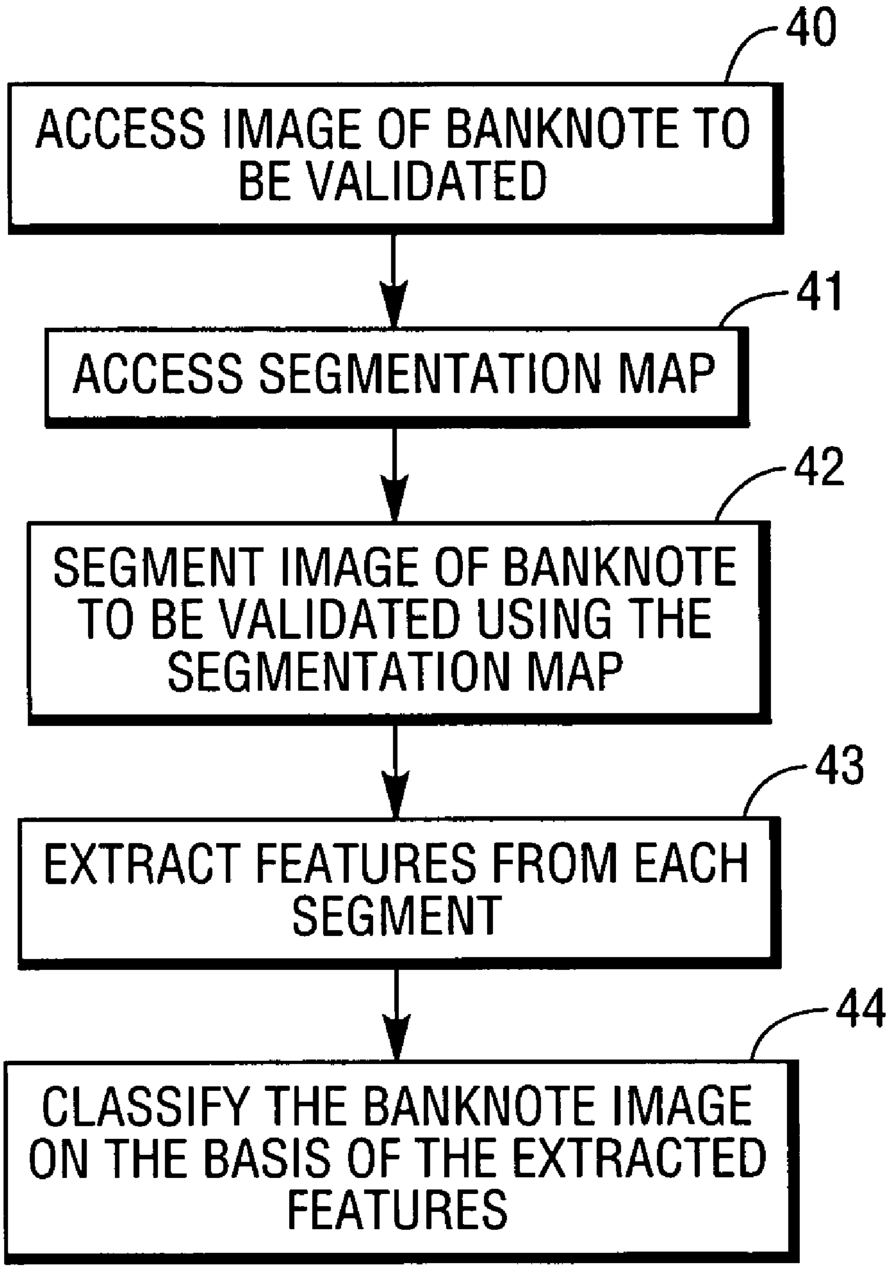
FIG. 4 is a flow diagram of a method of validating a banknote.

FIG. 4 is a flow diagram of a method of validating a banknote. The method comprises:

accessing at least one image of a banknote to be validated (box 40);

accessing a segmentation map (box 41);

segmenting the image of the banknote using the segmentation map (box 42);

extracting features from each segment of the banknote image (box 43);

classifying the banknote as being either valid or not on the basis of the extracted features using a classifier (box 44);

wherein the segmentation map is formed on the basis of information about each of a set of training images of banknotes. These method steps can be carried out in any suitable order or in combination as is known in the art. The segmentation map can be said to implicitly comprise information about each of the images in the training set because it has been formed on the basis of that information. However, the explicit information in the segmentation map can be a simple file with a list of pixel addresses to be included in each segment.

Figure 5:
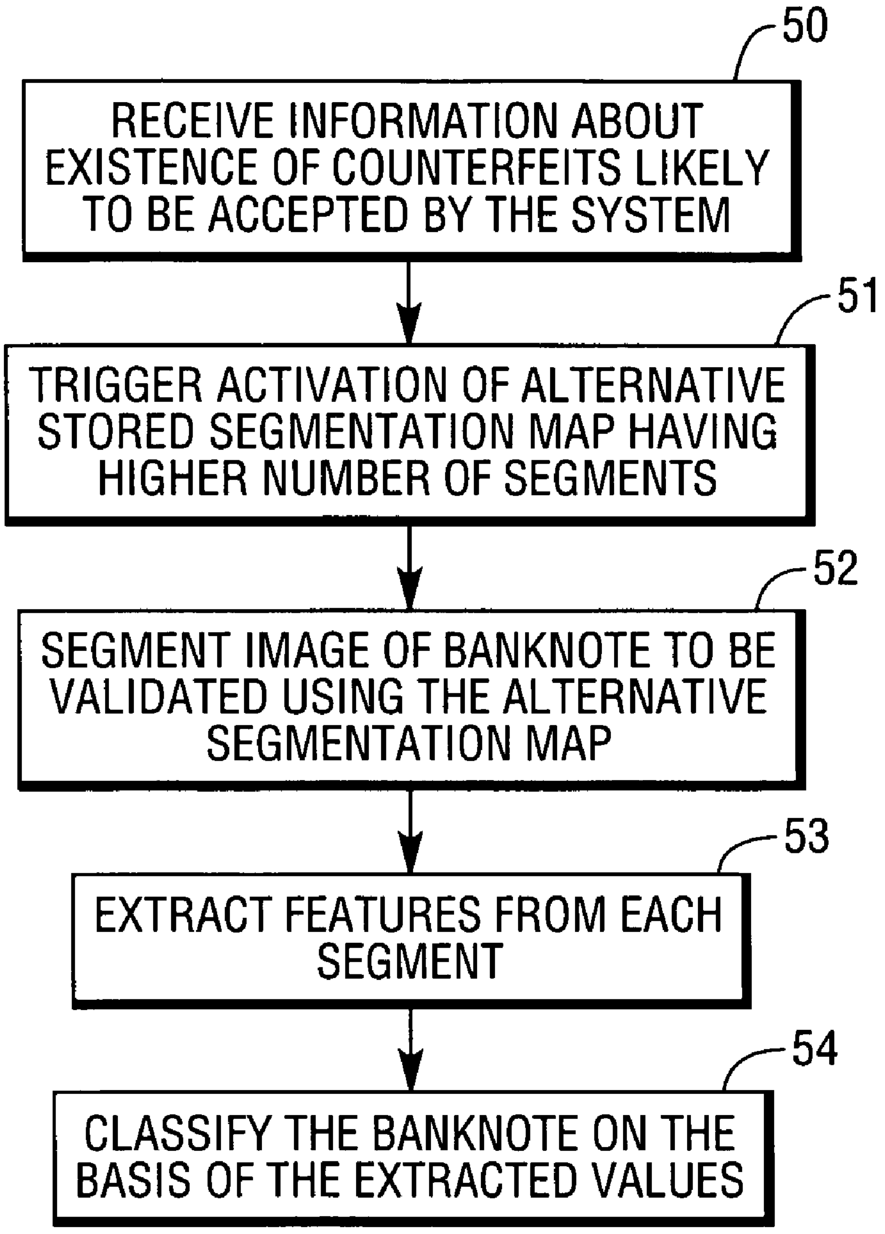
FIG. 5 is a flow diagram of a method of dynamically reacting to existence of improved quality counterfeit banknotes.

FIG. 5 is a flow diagram of a method of dynamically adjusting a currency validator. Information is received about the existence of counterfeits likely to be accepted by the system (see box 50). This information is either received at the currency validator itself, or at a central management location which then communicates the information to one or more currency validators. For example, a central management node issues an instruction to currency validators over a communications network or in any other suitable manner.

The information or received instruction triggers activation of an alternative stored segmentation map (see box 51). This segmentation map has a different number (usually a higher number of segments) than the segmentation map previously used. This alternative segmentation map can either be stored in a self-service apparatus locally beforehand, or stored in a server centrally then distributed to the affected apparatus over the network remotely when necessary. Once the alternative segmentation map is activated, replacing the previous segmentation map the method proceeds as described with reference to FIG. 4. That is, the image is segmented using the alternative segmentation map 52. Features are extracted from each segment (see box 53) and the banknote is classified on the basis of the extracted features (see box 54). ). It is also possible for each stored segmentation map to have associated with it a pre-computed, stored, set of classification parameters. In that case, the received information (box 50) may trigger activation of an alternative set of classification parameters to be used in a classifier for classifying media items as described herein.

Whilst the alternative segmentation map is being used it is possible for developers to create a new segmentation map to combat the counterfeit attack which uses a lower number of segments than the alternative segmentation map. Thus the use of the alternative template allows the automatic currency validation process to proceed whilst any retraining, template development, and distribution of the resulting material takes place.

In the method described above, only one alternative segmentation map is created and stored. However, it is possible to create and store a plurality of such alternative segmentation maps with different numbers of segments. It is then possible to select which of the alternative segmentation templates to use on a trial and error basis, or on the basis of previous experience, and/or detailed information about the particular counterfeit attack being experienced.

Also, the methods described herein have focused on situations where the number of segments increases. However, it is also possible for the number of segments to decrease. For example, suppose that an alternative template is being used with 15 segments. This incurs a relatively high processing cost and burden. Later, the source of the counterfeit notes is prevented such that it is possible to return to a segmentation template having fewer segments.

Previously, segmentation has been based on spatial position alone and we improve on this by basing segmentation on feature values such as pixel intensity profiles across images in the training set. In this way each training set image has an influence on segmentation. However, previously, when grid segmentation has been used this is not the case.

Figure 12:
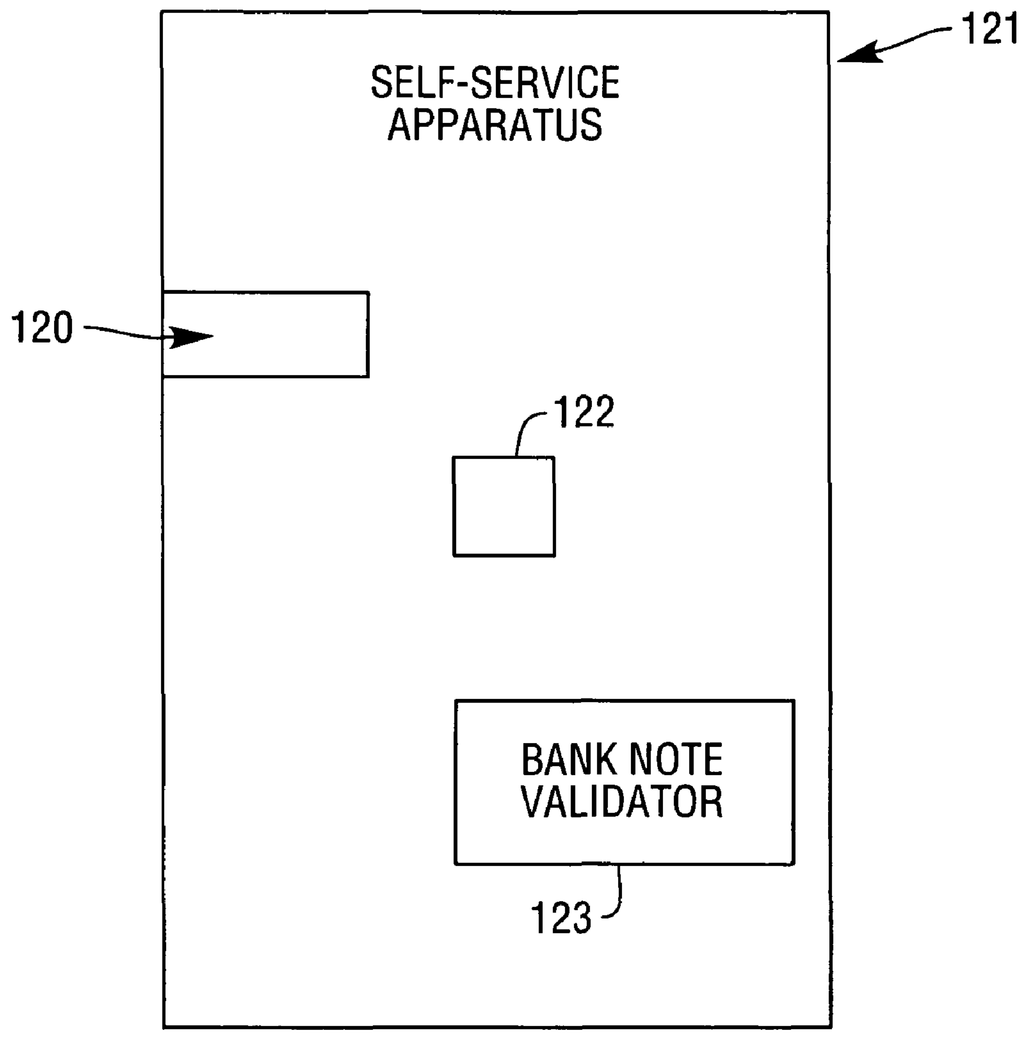
FIG. 12 is a schematic diagram of a self-service apparatus with a banknote validator.

FIG. 12 is a schematic diagram of a self-service apparatus 121 with a banknote validator 123. It comprises:

a means for accepting banknotes 120, imaging means for obtaining digital images of the banknotes 122; and a banknote validator 123 as described above.

The means for accepting banknotes is of any suitable type as known in the art as is the imaging means. A feature selection algorithm may be used to select one or more types of feature to use in the step of extracting features. Also, the classifier can be formed on the basis of specified information about a particular denomination or currency of banknotes in addition to the feature information discussed herein. For example, information about particularly data rich regions in terms of color or other information, spatial frequency or shapes in a given currency and denomination.

The methods described herein are performed on images or other representations of banknotes, those images/representations being of any suitable type. For example, images on any of a red, blue and green channel or other images as mentioned above.

The segmentation may be formed on the basis of the images of only one type, say the red channel. Alternatively, the segmentation map may be formed on the basis of the images of all types, say the red, blue and green channel. It is also possible to form a plurality of segmentation maps, one for each type of image or combination of image types. For example, there may be three segmentation maps one for the red channel images, one for the blue channel images and one for the green channel images. In that case, during validation of an individual note, the appropriate segmentation map/classifier is used depending on the type of image selected. Thus each of the methods described above may be modified by using images of different types and corresponding segmentation maps/classifiers.

Any range or device value given herein may be extended or altered without losing the effect sought, as will be apparent to the skilled person.

It will be understood that the above description of a preferred embodiment is given by way of example only and that various modifications may be made by those skilled in the art.

What is claimed is:

1. A method of creating a classifier for media validation said method comprising the steps of:

(i) accessing a training set of images of media items of a predetermined type;

(ii) creating a plurality of segmentation maps using the training set images, each segmentation map including information about relationships of corresponding image elements between all images in the training set and each segmentation map having a different number of segments than any other segmentation map;

(iii) for each segmentation map, calculating a set of classification parameters by segmenting each of the training set images using that segmentation map and extracting one or more features from each segment in each of the training set images;

(iv) forming a classifier using a first selected one of the sets of classification parameters corresponding to a first segmentation map containing a first number of segments; and (v) replacing the first set of classification parameters by a second set of classification parameters corresponding to a second segmentation map containing a second number of segments greater than the first number of segments without retraining the classifier when use of the first set of classification parameters to validate media items of unknown validity by the classifier results in a false accept rate above a predetermined threshold.

2. A method as claimed in claim 1 wherein the first selected set of classification parameters is selected on the basis of testing of the classifier using information about known counterfeits.

3. A method as claimed in claim 1 wherein the first selected set of classification parameters is selected on the basis of information about classification performance for segmentation maps having a variety of different numbers of segments.

4. A method as claimed in claim 1 wherein the step of replacing the first selected set of classification parameters is made on the basis of information about changes in a population of media items.

5. A method as claimed in claim 1 wherein the segmentation maps are created by using a clustering algorithm to cluster pixel locations in an image plane across all the images in the training set using the information.

6. A method as claimed in claim 1 which further comprises using a feature selection algorithm to select one or more types of feature to use in step (iii) of extracting features.

7. A method as claimed in claim 1 wherein the classifier is for banknote validation and which further comprises forming the classifier on the basis of specified information about a particular denomination and currency of banknotes.

8. A method as claimed in claim 1 which further comprises combining classifiers where necessary in step (v) of forming the classifier.

9. An apparatus for creating a media classifier comprising:

(i) an input arranged to access a training set of images of media items of a predetermined type;

(ii) a processor arranged to create a plurality of segmentation maps using the training set images, each segmentation map including information about relationships of corresponding image elements between all images in the training set and each segmentation map having a different number of segments than any other segmentation map;

(iii) a segmentor arranged to segment each of the training set images using each of the segmentation maps;

(iv) a feature extractor arranged to extract one or more features from each segment in each of the training set images for each of the segmentation maps; and (v) a classification parameter calculating means for calculating a set of classification parameters for each of the segmentation maps from the features;

(vi) classification forming means arranged to form a classifier using the features from each of the segmentation maps; and (vii) a selector arranged to select an optimum segmentation map as well as one or more alternative segmentation maps and corresponding classification parameters for use by the classifier in validating media items of unknown validity without retraining the classifier by evaluating past performance of the classifier in accepting invalid media items when configured with different classification parameters of a different segmentation map.

10. A media validator comprising:

(i) an input arranged to receive at least one image of a media item of a predetermined type to be validated;

(ii) a plurality of segmentation maps each segmentation map having a different number of segments than any other segmentation map and each segmentation map including information about relationships of corresponding image elements between all images in a training set of images of media items of the predetermined type;

(iii) a processor arranged to segment the image of the media item using one of the segmentation maps having a first number of segments;

(iv) a feature extractor arranged to extract one or more features from each segment of the image of the media item;

(v) a classifier arranged to classify the media item as being either valid or not on the basis of the extracted features in accordance with one set of classification parameters associated with the one segmentation map; and (vi) an adaptor, arranged to replace the one segmentation map and the one set of classification parameters with another segmentation map having a second number of segments greater than the first number and another set of classification parameters associated with the other segmentation map without retraining the classifier when use of the one segmentation map and the one set of classification parameters by the classifier results in a false acceptance of the media item as being valid.

11. A media validator as claimed in claim 10 wherein the segmentation maps comprise morphological information.

12. A media validator as claimed in claim 10 wherein the segmentation maps comprise information about a pixel at the same location in each of the training set images.

13. A media validator as claimed in claim 10 wherein the segmentation maps comprise pixel intensity profiles.

14. A media validator as claimed in claim 10 wherein the classifier is a one-class classifier.

15. A method of validating a media item comprising:

(i) accessing at least one image of a media item of a predetermined type to be validated;

(ii) accessing a plurality of segmentation maps, the segmentation maps including information about relationships of corresponding image elements between all images in a training set of media items of the predetermined type and each segmentation map having a different number of segments than any other segmentation map;

(iii) selecting one of the plurality of segmentation maps having a first number of segments and one set of classification parameters;

(iv) segmenting the image of the media item using the one segmentation map;

(v) extracting features from each segment of the image of the media item;

(vi) classifying the media item on the basis of the extracted features using a classifier in accordance with the one set of classification parameters associated with the one segmentation map; and (vii) replacing the one segmentation map and the one set of classification parameters with another segmentation map having a second number of segments greater than the first number and another set of classification parameters associated with the other segmentation map without retraining the classifier when use of the one set of classification parameters by the classifier results in a false acceptance of the media item as being valid.

16. A method as claimed in claim 15 wherein the segmentation map in step (iii) is selected according to information about changes in a population of media items.

17. A method as claimed in claim 16 wherein said information comprises information about the quality of counterfeit media items.

18. A non-transitory computer-readable medium having computer readable program code adapted to perform all the steps of a method of creating a classifier for media validation said method comprising the steps of:

(i) accessing a training set of images of media items of a predetermined type;

(ii) creating a plurality of segmentation maps using the training set images, each segmentation map including information about relationships of corresponding image elements between all images in the training set and each segmentation map having a different number of segments than any other segmentation map;

(iii) for each segmentation map, calculating a set of classification parameters by segmenting each of the training set images using that segmentation map and extracting one or more features from each segment in each of the training set images;

(iv) forming a classifier using a first selected one of the sets of classification parameters corresponding to a first segmentation map containing a first number of segments; and (v) replacing the first set of classification parameters with a second set of classification parameters corresponding to a second segmentation map containing a second number of segments greater than the first number of segments without retraining the classifier when use of the first set of classification parameters to validate media items of unknown validity by the classifier results in a false accept rate above a predetermined threshold.

19. A self-service apparatus comprising:

(i) a means for accepting media items, (ii) imaging means for obtaining digital images of the media items; and (iii) a media validator comprising:

(i) an input arranged to receive at least one image of a media item of a predetermined type to be validated;

(ii) a plurality of segmentation maps each segmentation map having a different number of segments than any other segmentation map and each segmentation map including information about relationships of corresponding image elements between all images in a training set of images of media items of the predetermined type;

(iii) a processor arranged to segment the image of the media item using one of the segmentation maps having a first number of segments;

(iv) a feature extractor arranged to extract one or more features from each segment of the image of the media item;

(v) a classifier arranged to classify the media item as being either valid or not on the basis of the extracted features in accordance with one set of classification parameters associated with the one segmentation map; and (vi) an adaptor, arranged to replace the one segmentation map and the one set of classification parameters with another segmentation map having a second number of segments greater than the first number and another set of classification parameters associated with the other segmentation map without retraining the classifier when use of the one set of classification parameters by the classifier results in a false acceptance of the media item as being valid.

* * * * *